United States Patent [19]

Kusaka

[11] Patent Number: 4,745,425

[45] Date of Patent: May 17, 1988

[54] AUTOMATIC FOCUS CONTROL APPARATUS

[75] Inventor: Yosuke Kusaka, Yokohama, Japan

[73] Assignee: Nippon Kogaku K. K., Tokyo, Japan

[21] Appl. No.: 915,011

[22] Filed: Oct. 3, 1986

[30] Foreign Application Priority Data

Oct. 8, 1985 [JP] Japan .................................. 60-224164

[51] Int. Cl.$^4$ .............................................. G03B 3/00
[52] U.S. Cl. ................................... 354/400; 354/402; 250/201
[58] Field of Search ................ 354/400, 402; 250/201, 250/204

[56] References Cited

U.S. PATENT DOCUMENTS 4,537,487  8/1985  Taniguchi et al. .................. 354/400
4,550,994  11/1985  Maruyama .......................... 354/402
4,557,577  12/1985  Shinoda .............................. 354/400

Primary Examiner—Russell E. Adams
Attorney, Agent, or Firm—Shapiro and Shapiro

[57] ABSTRACT

An apparatus for controlling a focal point of a photographing optical system of a camera is so designed that an overshooting amount of the photographing optical system from a braking timing of a driving means under the control of a driving controlling means is always monitored, and at the same time the overshooting amount is fed back to speed control of the driving means or control for determining a timing of the generation of a brake signal. The apparatus is capable of always and properly stopping the photographing optical system within a focus zone.

15 Claims, 7 Drawing Sheets

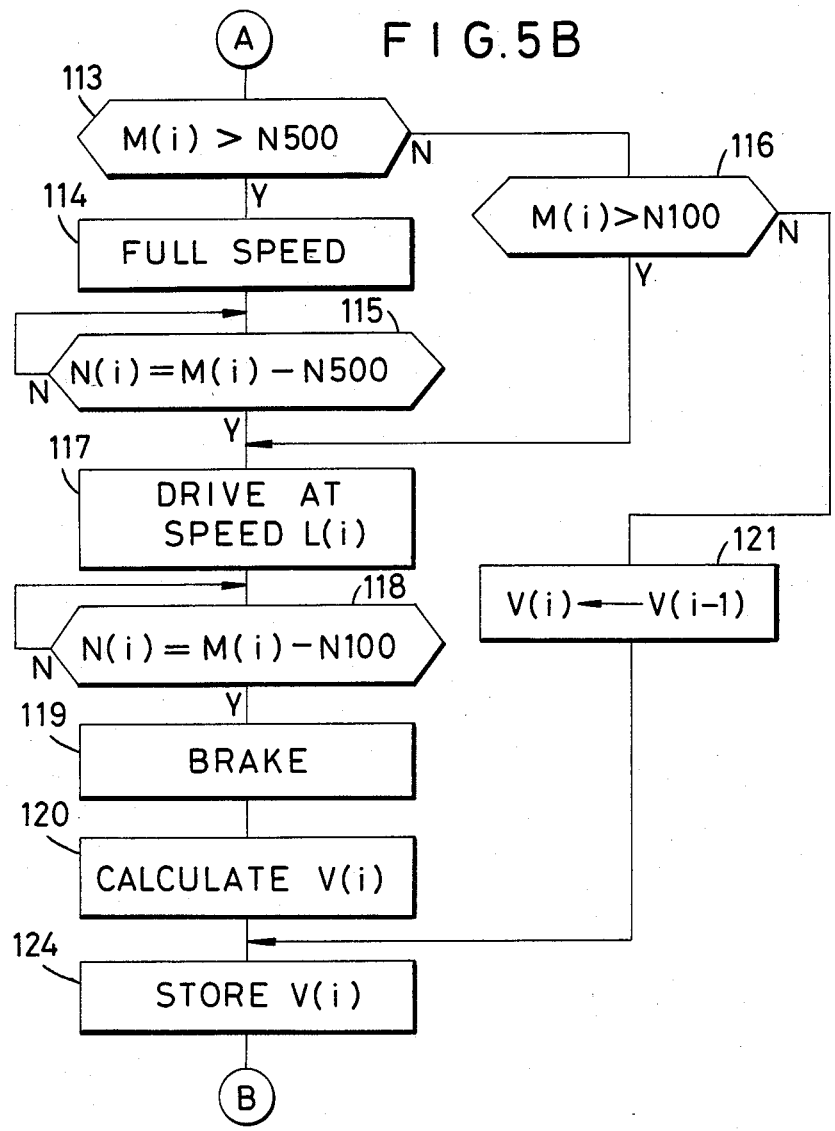
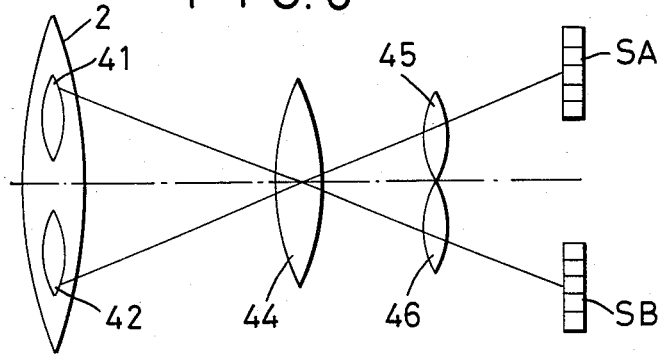

AUTOMATIC FOCUS CONTROL APPARATUS

BACKGROUND OF THE INVENTION

1. Field of the Invention

The present invention relates to an automatic focus control apparatus for a camera or the like.

2. Related Background Art

In a typical conventional automatic focus control apparatus for a camera or the like, defocus data P(i) (i represents a deviation of the ith cycle) representing a deviation from a just-in-focus position of the photographing optical system and also representing a focusing direction is generated by a focus position detecting means. A driving controlling means calculates expected driving amount data M(i) and driving direction data D(i) so as to drive the photographing optical system to the just-in-focus position on the basis of the data P(i). The photographing optical system is driven by the driving means on the basis of data M(i) and data D(i) to the just-in-focus position. The driving controlling means causes the driving means to drive the photographing optical system on the basis of the driving direction data D(i) and causes a monitoring means to monitor driving of the driving means so as to accumulate a monitor signal corresponding to the actual driven amount of the photographing optical system. When the driven amount data N(i) has a predetermined relationship (i.e., a coincidence or just-in-focus state) with the expected driving data Mi, the driving means brakes the photographing optical system, thereby moving the photographing optical system in the just-in-focus position.

In the above apparatus, the photographing optical system is overshot during the period from the braking timing to the timing at which the photographing optical system is actually stopped.

The main reasons for such overshooting are stop characteristics of a driving source (e.g., a motor) of the driving means, an arrangement (e.g., a gear ratio and transmission characteristics) of the driving means, and a load and inertia of the photographing optical system.

In order to control the overshooting of the photographing optical system within a predetermined allowable focusing range (to be referred to as a focus zone hereinafter), the following control method is proposed.

An information means for storing data associated with the stop characteristics of the drive source, data associated with the arrangement of the driving means, and data associated with the load and inertia of the photographing optical system is arranged in the automatic focus control apparatus. The driving means is braked and decelerated near the focus zone according to the data from the information means under the control of the driving controlling means.

However, in such an automatic focus control apparatus, since data associated with overshooting is completely fixed data, mechanical variations in the individual driving means and photographing optical system, temperature changes, changes in gravity acting on the lens upon changes in camera position, changes in driving characteristics (e.g., deterioration over time) caused by incomplete lubrication of gears may excessively decelerate the photographing optical system near the focus zone or may excessively accelerate it so that the photographing means may fall outside the focus zone.

SUMMARY OF THE INVENTION

It is, therefore, an object of the present invention to provide an automatic focus control apparatus capable of always and properly stopping a photographing optical system within a focus zone.

The present invention is based upon a technical assumption wherein an overshooting amount of the photographing optical system from a braking timing of a driving means under the control of the driving controlling means is always monitored, and at the same time the overshooting amount is fed back to speed control of the driving means or control for determining timing of generation of the brake signal.

Each embodiment of the present invention is also applicable to an apparatus for spontaneously driving a lens according to changes in distance to an object to be photographed and an apparatus for inhibiting driving of the lens until exposure operation is completed upon establishment of the just-in-focus state.

BRIEF DESCRIPTION OF THE DRAWINGS

FIGS. 5A and 5B are flow charts for explaining the operation according to the first embodiment of the present invention;

FIG. 8 is a schematic view showing a focus detection optical system applied to the present invention.

DETAILED DESCRIPTION OF THE PREFERRED EMBODIMENTS

Figure 1:
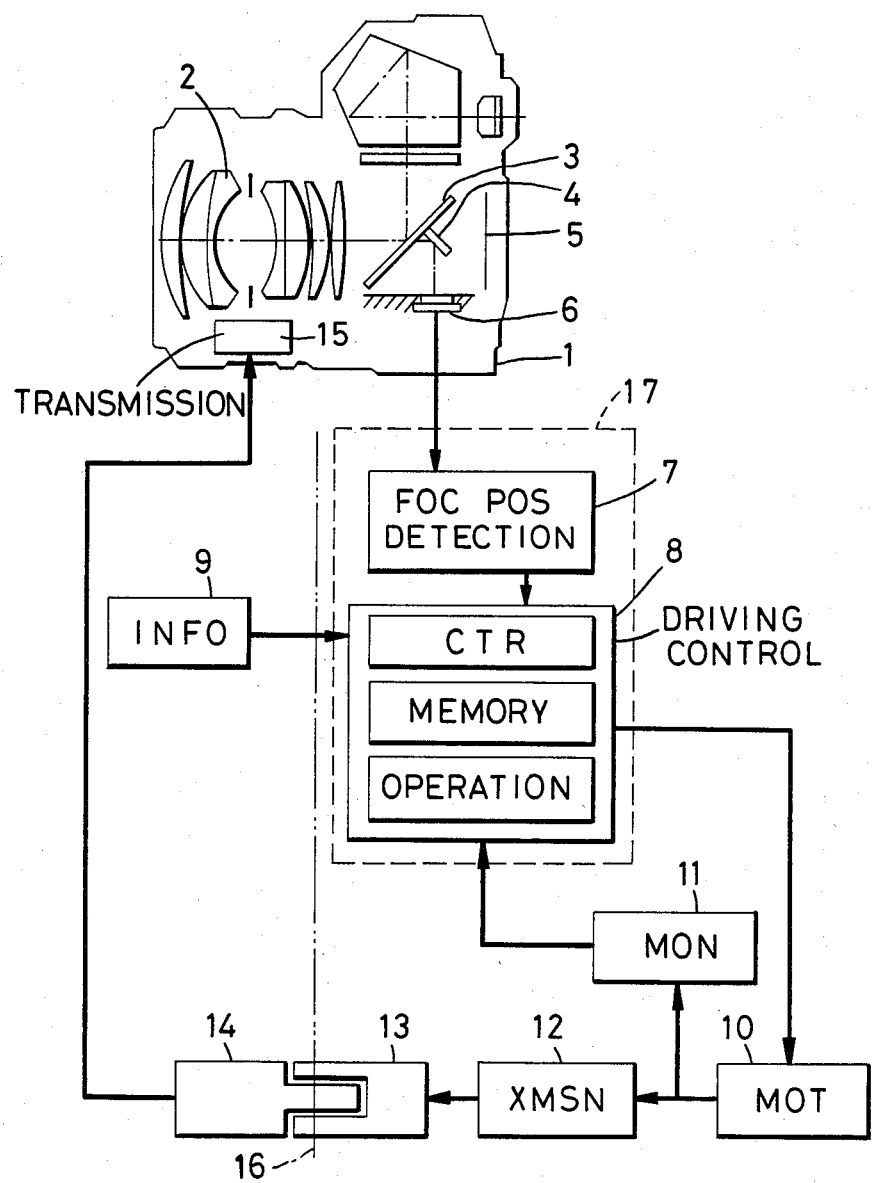
FIG. 1 is a schematic view showing an automatic focus control apparatus according to the present invention.

Referring to FIG. 1, a beam from an object to be photographed is reflected by a main mirror 3 and a half mirror 4 through a photographing optical system (i.e., an interchangeable lens) 2 attached to a single-lens reflex camera body 1. The beam reflected by the half mirror 4 is guided onto a focus detection optical system 6 having a detection surface at a position equivalent to a film surface 5. The focus position detection optical system 6 comprises a refocusing optical system consisting of a field lens 44 located at a position equivalent to the film surface 5, a pair of refocusing lenses 45 and 46 located behind the field lens 44, and a pair of image sensors SA and SB located behind the lenses 45 and 46, as shown in FIG. 8. A pair of object images by means of beams passing through a pair of regions 41 and 42 of the exit pupil of the photographing optical system 2 are respectively formed on the image sensors SA and SB. The image sensors SA and SB generate signals corresponding to the intensity distributions of the object images on the image sensors SA and SB. An arithmetic unit or operation unit for calculating a deviation from the just-in-focus position of the photographing optical system 2 and the direction of deviation on the basis of the pair of signals represnting the relative deviations is known to those skilled in the art.

The object image signals are supplied from the focus detection optical system 6 to a focus position detecting means 7. The focus position detecting means 7 receives these signals and calculates defocus data P(i) representing the deviation of the photographing optical system 2 from the just-in-focus point and the direction of deviation. In should be noted that i represents the defocus data P in the ith cycle so that the defocus data signals are discretely and time-serially generated.

A driving controlling means 8 includes a counter, a memory, and an operation unit therein. The driving controlling means 8 receives driving associated data A and B from an information outputting means 9 and a monitor signal from a monitoring means 11 for monitoring a driving amount of a motor 10, and controls the driving means. A detailed operation of the driving controlling means 8 will be described later on.

The driving means comprises motor 10, a body transmission mechanism 12, a body coupling 13 mounted on a mount surface 16, a lens coupling 14 mounted on the mount surface 16, and a lens transmission mechanism 15. The driving force from the motor 10 mounted in the body is transmitted to the photographing optical system 2 through the mount surface 16 with the arrangement described above. Eventually, the lens is moved.

The monitoring means 11 comprises a photointerrupter or a photoreflector. The monitoring means 11 is arranged between the motor 10 and the body coupling 13 and outputs a monitor signal corresponding to the driving amount. For example, the monitoring means 11 generates a monitor signal consisting of 10 pulses per revolution (i.e., 10 pulses/rev.) of the motor 10.

The information outputting means 9 arranged in the photographing optical system 2 outputs lens driving coefficient data A (rev/mm) representing the speed and the rotational direction of the lens coupling 14 so as to shift the focusing lens by 1 mm. In this case, the sign of the lens driving coefficient data A represents the rotational direction. The information outputting means 9 also outputs load torque data B (g/cm) upon rotation of the lens coupling 14.

The detailed operation of the driving controlling means 8 will be described below. The driving controlling means 8 receives the defocus data P(i) from the focus detecting means 7 and calculates expected driving amount data M(i) for the driving means so as to cause the driving means to drive the photographing optical system 2 to the just-in-focus position. The driving controlling means 8 controls the speed of the motor 10 on the basis of the expected driving amount data M(i) to set the photographing optical system 2 in the just-in-focus position. More specifically, the driving controlling means 8 monitors the speed of the motor 10 on the basis of pulse conversion coefficient data K (representing the number of pulses of the monitoring means per revolution of the motor 10) generated by the monitoring means 11. When the photographing optical system 2 is shifted by a distance represented by the defocus data P(i), the driving controlling means 8 receives the pulse conversion coefficient data K, the body driving coefficient data C (data such as a gear ratio, determined by an arrangement of the body transmission mechanism and representing the speed of the motor 10 per revolution of the body coupling 13), and the lens driving coefficient data A (rev/mm) representing the speed of the lens coupling 14 and its rotational direction, and calculates expected driving amount data M(i).

The driving controlling means 8 uses the accumulated pulses of the monitor signal from the monitoring means 11 and calculates the expected driven amount data M(i) (pulses) corresponding to the defocus data P(i) according to equation (1) below:

$$M(i)(\text{pulses}) = P(i)(\text{mm}) \times A(\text{rev/mm}) \times C \times K(\text{pulses/rev}) \quad (1)$$

Both the data C and the data K are stored in an internal memory in the driving controlling means 8.

The driving controlling means 8 calculates the driving direction data D(i) according to the sign of the defocus data P(i) and the sign of the lens driving coefficient data A, and controls the rotational direction of the motor on the basis of the resultant data.

Figure 2:
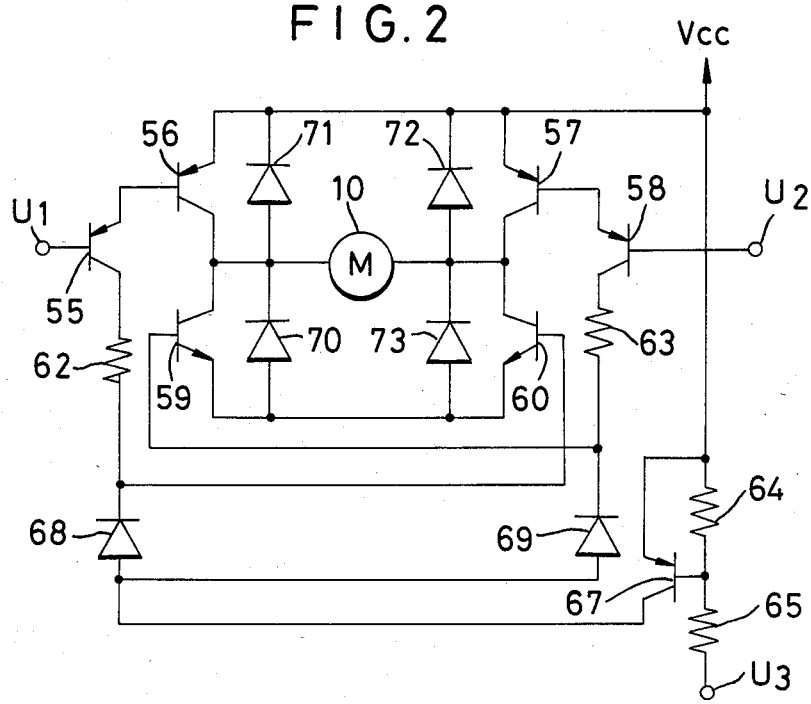
FIG. 2 is a circuit diagram of a motor control circuit of the apparatus in FIG. 1.

FIG. 2 is a circuit diagram of a motor controller and the motor 10 in the driving controlling means 8. The driving controlling means 8 comprises the motor 10, pnp transistors 55, 56, 57, 58 and 67 npn transistors 59 and 60, resistors 62, 63, 64, 65 and 66 and diodes 68, 69, 70, 71, 72 and 73.

By changing the levels (high and low levels) of voltages applied to terminals U1, U2 and U3, the rotational direction control, speed control, and brake control of the motor 10 can be performed.

Figure 3:
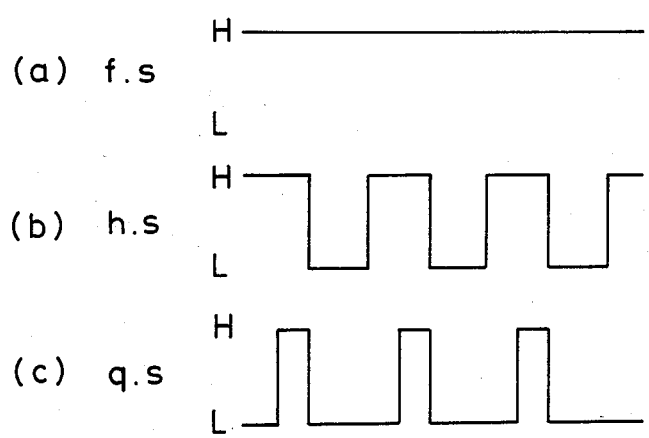
FIGS. 3a to 3c are timing charts of signals of motor control driving signals in the apparatus of FIG. 1.

If the terminal U1 is set to be LOW level (to be referred to as an L level hereinafter), the terminal U2 is set to be HIGH level (to be referred to as an H level hereinafter), and the terminal U3 is set to be H level, as shown in FIG. 3A, then the transistors 55, 56 and 60 are turned on to supply the current through the motor 10 from the left to right. The focusing lens is continuously (to be referred to as a full speed hereinafter) driven toward the just-in-focus direction.

As shown in FIG. 3b, if the terminal U1 receives a pulse signal having a duty ratio (to be referred to as a duty hereinafter) of 50% and the terminal U3 receives an inverted signal of the input signal at the terminal U1, the transistor 67 is turned on for an L level duration of the terminal U3 so that the transistors 59 and 60 are turned on through the resistor 66 and the diodes 68 and 69. The motor 61 is electrically connected through the transistors 59 and 60 and is braked by a counter electromotive force.

Since the motor 10 is repeatedly energized with a 50% duty and braked, the speed can be reduced to abount ½ of the full speed (f.s) and is referred to as a half speed (h.s) hereinafter.

As shown in FIG. 3c, if a pulse signal having a 25% duty is supplied to the terminal U1 and a signal obtained by inverting the signal supplied to the terminal U1 is supplied to the terminal U3, the operation is the same as that of the case wherein the duty is 50%, but the speed is further reduced to about ½ the speed at the 50% duty (to be referred to as a quarter speed (q.s) hereinafter).

If the terminals U1 and U2 are set at H level and the terminal U3 is set at L level, the transistors 55, 56, 57 and 58 are turned off. The input terminal U3 is set at L level so that the transistor 67 is turned on. The transistors 59 and 60 are then turned on through the resistor 66 and the diodes 68 and 69. The motor 10 is electrically connected through the transistors 59 and 60. The motor 10 is thus braked and abruptly stopped by the counter electromotive force. However, if the input levels of the terminals U1 and U2 are inverted as compared with the above case, the same speed control as described above is performed except that the rotation of the motor is reversed.

The driving controlling means 8 controls the motor driving direction on the basis of the driving direction data D(i) upon control of the terminals U1, U2 and U3. The speed of the motor 10 can be changed as needed.

Figure 4A:
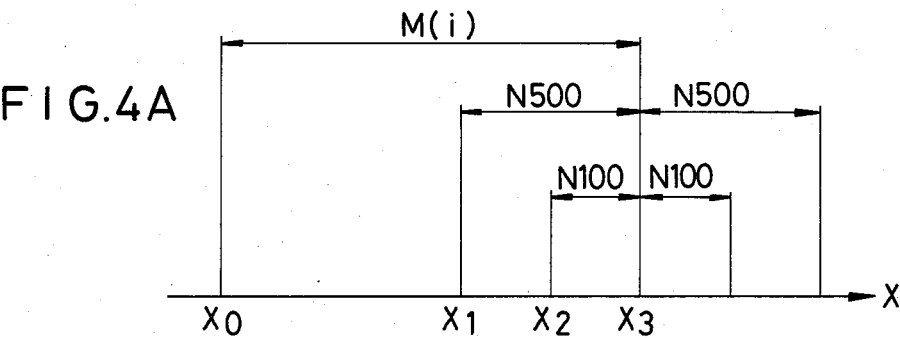
FIGS. 4A, 4B and 4C are charts for explaining the operation according to a first embodiment of the present invention.
Figure 4B:
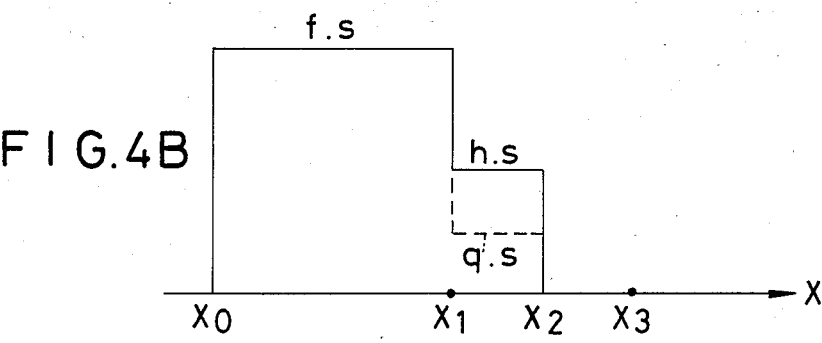
Figure 4C:
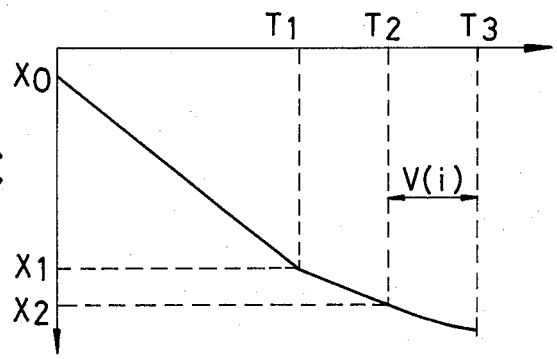

FIGS. 4A, 4B and 4C are views showing speed control of the driving controlling means 8 for the motor 10. The X- and T-axes represent the position and time of the photographing optical system, respectively.

The driving controlling means 8 calculates expected driving amount data M(i) and the driving direction data D(i) on the basis of the defocus data P(i) obtained at time T0 when the focusing lens of the photographing optical system 2 is located at position X0. The driving means is driven on the basis of the driving direction data D(i). The driving means drives the focusing lens of the photographing optical system 2 at the full speed toward the just-in-focus position X3. At the same time, the monitor signal pulses from the monitoring means 11 are counted to detect the driven amount data N(i).

If in the predetermined near-focus zone (i.e., an area falling within $|X114\ X3|$ from the just-in-focus position X3), e.g., the moving range of the focusing lens is ±0.5 mm of the just-in-focus range, the driving controlling means 8 calculates driving amount data N500 (representing the number of pulses of the monitor signal) such that 0.5 mm is substituted into P(i) in equation (1). If the driven amount data N(i) reaches a value obtained by subtracting the driving amount data N500 representing the near-focus zone from the expected driving data M(i) at time T1, i.e., time at which the photographing optical system 2 reaches the position X1 spaced apart by 0.5 mm from the just-in-focus position X3, the motor speed is switched to a speed L(i) used within the near-focus zone. A zone including the just-in-focus position and a quasi just-in-focus position is defined as focus zone, and the near-focus zone is defined as a zone including the focus zone and one larger than that.

The initial driving of the focusing lens will be described below.

If the initial state is given, i.e., if i=1, the speed L(i) used within the near-focus zone is determined on the basis of the lens load torque data B obtained from the information outputting means 9 in the photographing optical system 2. For example, data of all load torques acting on the motor shaft is defined as Q as follows:

$$Q=(B/C)+R \qquad (2)$$

where
C: body driving coefficient data representing a gear ratio between the motor shaft and the body coupling.
R: data of a load torque acting on the motor shaft when the photographing optical system 2 is not attached to the body.

The body driving coefficient data C and the load torque data R are stored in an internal memory of the driving controlling means 8.

The driving controlling means 8 then calculates driving amount data N100 (as the pulses of the monitor signal wherein N500>N100) representing a predetermined focus zone (the zone within $|X2-X3|$ with respect to the just-in-focus position X3), e.g., a focus zone corresponding to the range of ±0.1 mm of the just-in-focus position. This calculation is performed such that 0.1 mm is substituted into P(i) in equation (1). The data N100 is then stored in the internal memory of the driving controlling means 8.

The driving controling means 8 stores in a table in the internal memory the relationship between the all load torque data Q of the motor shaft and the overshooting amount of the motor shaft rotation upon braking while the focusing lens is driven at the full speed, the half speed, or the quarter speed. The driving controlling means 8 accesses the table to calculate the overshooting amount of the motor shaft at each speed corresponding to the all load torque data Q.

The overshooting amount of the motor shaft at each speed is compared with data 2·N100 corresponding to twice the calculated focusing zone, so that a speed which is less than 2·N100 corresponding to twice the speed corresponding to the focus zone and which represents a maximum overshooting amount of the motor shaft is calculated as an optimal speed. The full speed (f.s) of the focusing lens is switched to the calculated speed at the position X1 at time T1. More specifically, as shown in FIG. 4B, when the focusing lens is driven from the position X0 at the full speed and reaches the position X1 in the near-focus zone, the focusing lens is driven at an optimal speed (i.e., the half speed (f.s) or the quarter speed (q.s)). The focusing lens is then stopped at position X2 within the focus zone. Therefore, the maximum driving speed can be obtained within the near-focus zone. However, even if the focusing lens is braked within the focus zone, the focusing lens in the photographing optical system 2 does not go beyond the focus zone.

For example, upon driving at the all load torque R of 2 gcm, assume that an overshooting amount at the full speed is given as 15 pulses; the half speed, 10 pulses; and the quarter speed, 5 pulses. If the driving amount data 2·N100 given within the focus zone of the photographing optical system 2 represents 12 pulses, the half speed is selected as that for the near-focus zone.

If N(1)=M(1)-N100 is established at time T2, i.e., if the focusing lens in the photographing optical system 2 reaches the position X2 which is spaced by 0.1 mm from the just-in-focus position X3 and which is located at the end of the focus zone, the motor is braked. The focusing lens of the photographing optical system 2 passes through the position X2 and is stopped at a position within the focus zone.

In this case, the driving controlling means 8 causes its internal counter to count pulses of the monitor signal from the monitoring means 11 and calculates the overshooting data V (i=1) of the focusing lens of the photographing optical system 2 for a predetermined period in which the motor is braked at time T2 and then the motor and the focusing lens of the photographing optical system 2 are completely stopped at time T3.

The calculated overshooting data V (i=1) determines the speed L (i=2) for the next cycle i=2 within the near-focus zone. The currently obtained overshooting data V (i=n-1) is used for determining L(n) for the next cycle i=n within the near-focus zone.

Each next data L(i) used within the near-focus zone is determined in the following manner. If the actually measured overshooting data V(i) is larger than the driving amount 2·N100 corresponding to the focus zone, the next L, i.e., L(i+1) of the near-focus zone is decreased (the focusing lens is decelerated) by one step from the current L, i.e., L(i). For example, the full speed is decreased to the half speed.

If the overshooting data V(i) is larger than the data N100 and smaller than data 2·N100, the next L, i.e., L(i+1) within the near focus zone is the current L, i.e., L(i) within the near-focus zone.

If the overshooting data V(i) is smaller than the focus zone driving amount data N100, the next L, i.e., L(i+1) within the near-focus zone is increased by one step (the focusing lens is accelerated by one step) from the current L, i.e., L(i) within the near focus zone. For example, the quarter speed is increased to the half speed.

Figure 5A:
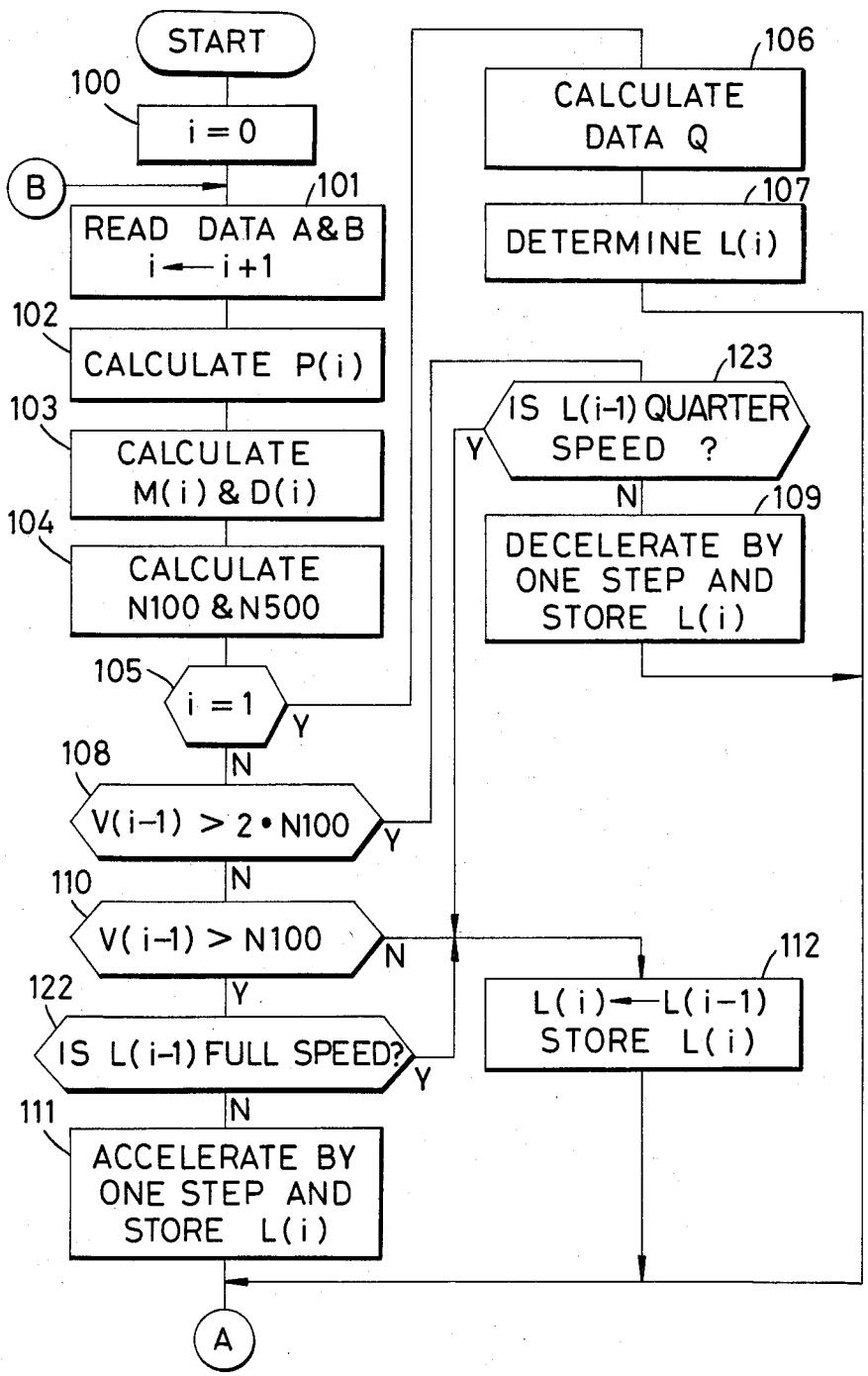

In this manner, the previous data V(i) is always fed back by the monitoring means 11 to determine the next L, i.e., L(i+1) within the near-focus zone. The overshooting amount after braking is controlled so that the focusing lens does not fall outside the focus zone. At the same time, the focusing lens is driven at an optimal speed within the near-focus zone. The operations of the focus detecting means 7 and the driving controlling means 8 are performed by the program stored in a microcomputer represented by reference numeral 17 in FIG. 1. The operation sequence is shown in FIGS. 5A and 5B. The operations in FIGS. 5A and 5B are performed while a user depresses the shutter release button of the camera of the present invention up to, e.g., the first step. When the user fully depresses the button, or releases it, the operations in FIGS. 5A and 5B are interrupted. In this case, full depression of the shutter release button causes the exposure operation.

Referring to FIGS. 5A and 5B, when the user depresses the shutter release button to the first step, i=0 in step 100. In step 101, the lens driving coefficient data A and the load torque data B are read from the information outputting means 9.

In step 102, the defocus data P(i) is calculated on the basis of the outputs from the image sensors in the focus detection optical system 6.

In step 103, the expected driving amount data M(i) and the driving direction data D(i) are calculated on the basis of the defocus data P(i), the lens driving coefficient data A, the body driving coefficient data C, and the pulse conversion coefficient K.

In step 104, the focus zone driving amount data N100 and the near-focus zone driving data N500 are calculated.

In step 105, the driving controlling means 8 determines whether the current check is the first check. If YES in step 105, i.e., if i=1, then the flow advances to step 106. However, if NO in step 105, the flow advances to step 108.

In step 106, the all load torque data Q is calculated on the basis of the load torque data B and R, and the body driving coefficient data C.

In step 107, a speed giving a maximum overshooting amount which is included in the overshooting amounts derived upon braking at the all load torque data Q (calculated in step 106) at each of the full, half, and quarter speeds, and which does not exceed twice the focus zone driving amount data N100 is defined as the current speed L, i.e., L(i) within the near-focus zone. The determined L(i) is stored in the internal memory in the driving controlling means 8, and then the flow advances to step 113.

The driving controlling means 8 determines in step 108 whether the previous overshooting data, i.e., V(i−1) is larger than twice the focus zone driving amount data N100. If YES in step 108, the flow advances to step 123. Otherwise, the flow advances to step 110. The driving controlling means 9 determines in step 123 whether L(i−1) is the quarter speed. If YES in step 123, the flow advances to step 112. Otherwise, the flow advances to step 109.

In step 109, the current near-focus zone speed L(i) is decreased by one step from the previous near-focus zone speed L(i−1). The data L(i−1) is set in the internal memory in the driving controlling means 8, and the flow advances to step 113.

The driving controlling means 8 determines in step 110 whether the previous overshooting data V(i−1) is larger than the focus zone driving amount data N100. If YES in step 110, the flow advances to step 112. otherwise, the flow advances to step 122. The driving controlling means 9 determines in step 122 whether L(i−1) is the full speed. If YES in step 122, the flow advances to step 112. Otherwise, the flow advances to step 111.

In step 111, the current near-focus zone speed L(i) is increased by one step from the previous nearfocus zone speed L(i−1), and the updated data is stored in the internal memory in the driving controlling means 8. The flow then advances to step 113.

In step 112, the current near-focus zone speed L(i) is set to be the previous near-focus zone speed, and the updated data is stored in the internal memory in the driving controlling means 8. The flow then advances to step 113.

The driving controlling means 8 determines in step 113 whether the expected driving amount data M(i) is larger than the near-focus zone driving amount data N500. If YES in step 113, the flow advances to step 114. Otherwise, the flow advances to step 116.

In step 114, the driving means is driven at the full speed in a direction determined on the basis of the driving direction data D(i).

The driving controlling means 8 determines in step 115 whether the driven amount data N(i) representing the accumulated value of the pulses of the monitor signal from the monitoring means 11 reaches M(i)−N500. If NO in step 115, the operation in step 115 is repeated. Otherwise, the flow advances to step 117.

The driving controlling means 8 determines in step 118 whether the expected driving amount data M(i) is larger than the focus zone driving amount data N100. If YES in step 118, the flow advances to step 117. Otherwise, the flow advances to step 121.

In step 121, the current overshooting amount data V(i) is stored as the previous overshooting data V(i−1) in the internal memory in the driving controlling means 8, and the flow then returns to step 101.

The focusing lens is driven at the optimal drive speed L(i) within the near-focus zone in step 117, and the flow advances to step 118.

The driving controlling means 8 determines in step 118 whether the driven amount data N(i) reaches M(i)−N100. If YES in step 118, the focusing lens is braked in step 119.

In step 120, a difference between the value of (M(i)−N100) and the value of N(i) obtained at a time when a predetermined period of time has elapsed and the lens is supposed to be stopped upon braking in step 119 is calculated to calculate the overshooting data V(i). In step 124, the data V(i) is stored in the internal memory in the driving controlling means 8, and the flow returns to step 101.

If the power switch is arranged separately from the shutter release button in this embodiment, data L(i) and data V(i) may be kept stored in the internal memory while the power switch is ON even if the half depression state of the shutter release button may be cancelled. In this case, the data is cleared when the power switch is turned off. Even if the power switch is kept ON, data L(i) and data V(i) may be cleared upon interchanging of the photographing lens.

The basic arrangement of a second embodiment is substantially the same as that of the first embodiment, except for the operation of a driving controlling means 8. In the second embodiment, the speed of the driving means immediately before braking is predetermined, and the braking distance from the just-in-focus position varies.

Figure 6A:
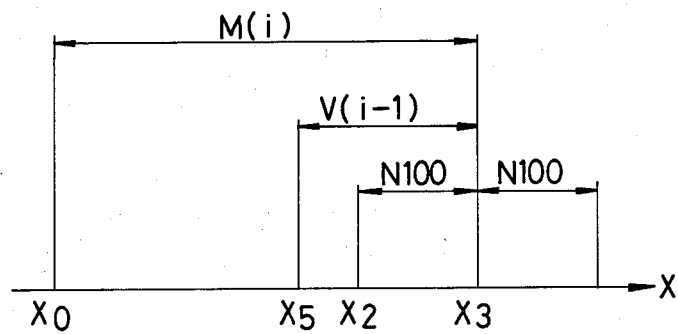
FIGS. 6A, 6B and 6C are charts for explaining the operation according to a second embodiment of the present invention.

Referring to FIG. 6A, focus zone driving amount data N100 is the same as that of the first embodiment. Defocus data P(i), expected driving amount data M(i), and driving direction data D(i) are obtained at the position X0 of the focusing lens in the photographing optical system 2 at time T0. The driving means is driven at the full speed toward the just-in-focus position X3.

At the same time, pulses of the monitor signal from the monitoring means 11 are continuously counted to detect the driven amount data N(i) of the driving means.

When $N(i)=M(i)-V(i-1)$ is established at time T5 (FIG. 6C), i.e., the focusing lens is located at a position X5 spaced apart by previous overshooting data $V(i-1)$ from the just-in-focus position, the driving means is braked. At the same time, counting of pulses of the monitor signal from the monitoring means 11 is started from time T5, and overshooting amount data $V(i-1)$ of the driving means at time T3 after a lapse of a sufficient time required for completely stopping the driving means is calculated.

Figure 6B:
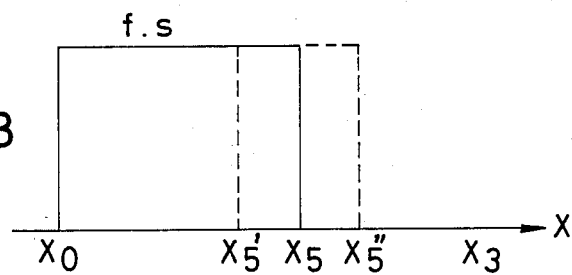
Figure 6C:
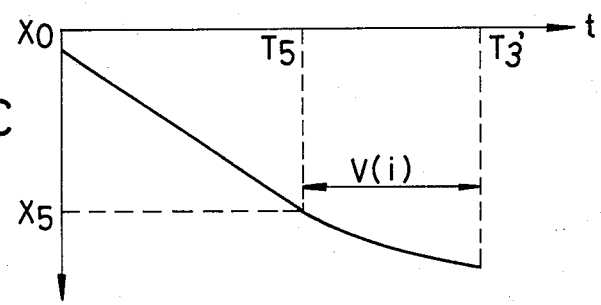

The braking point varies such as X5, X5' and X5" according to the magnitudes of the previous overshooting data $V(i-1)$, as shown in FIG. 6B. However, such overshooting of the focusing lens in the photographing optical system 2 guarantees stop thereof near the just-in-focus position.

The next braking position is determined by the current overshooting amount data V(i).

Since the previous overshooting amount data is not obtained in the initial step (i=1), the overshooting amount obtained upon braking at the full speed for the all load torque data Q is read out from a table in the internal memory, and the resultant data is defined as the previous overshooting amount data V (I=0).

Figure 7:
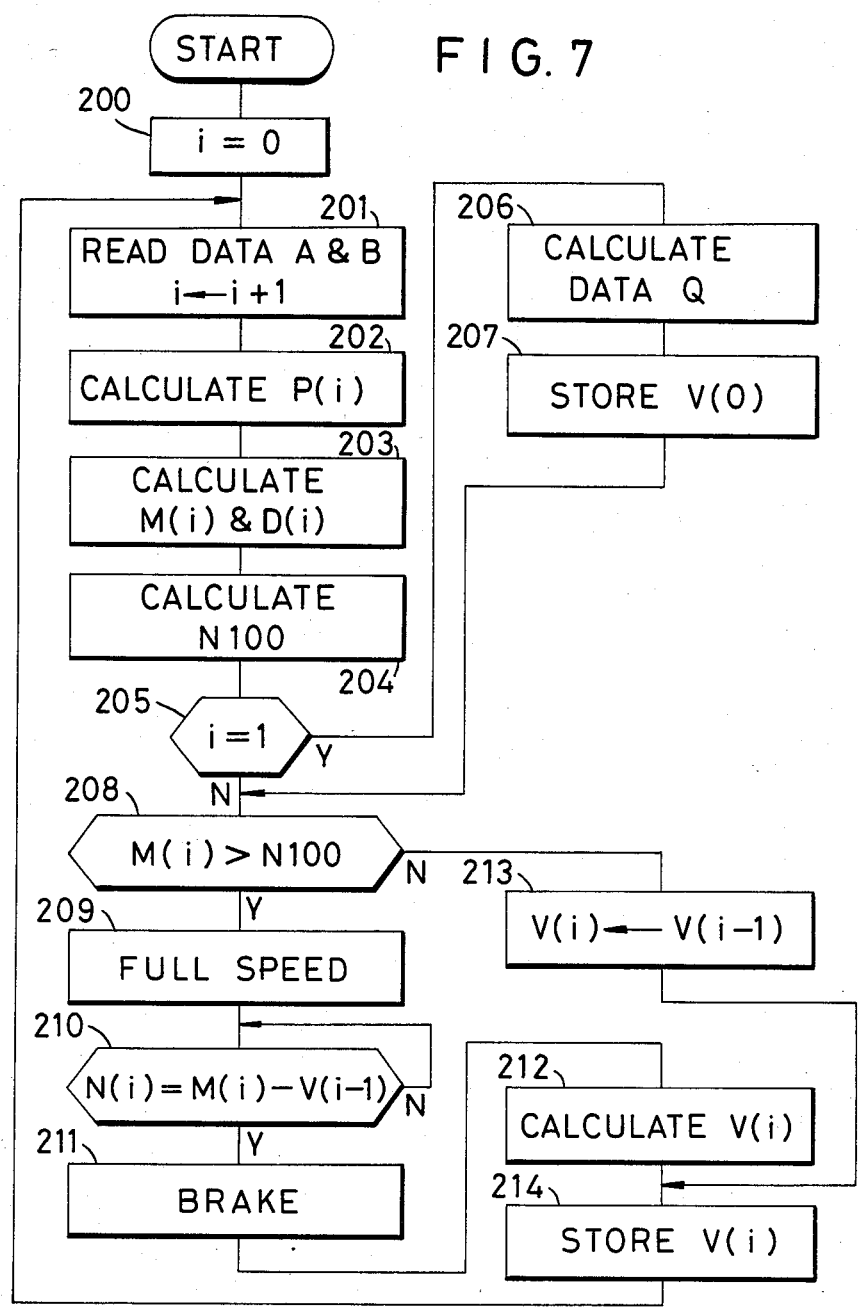
FIG. 7 is a flow chart for explaining the operation according to a second embodiment of the present invention.

FIG. 7 shows a flow chart for explaining the operation of the focus position detecting means 7 and the driving controlling means 8 according to the second embodiment.

The operations in steps 200, 201, 202 and 203 are respectively the same as those in steps 100, 101, 102, and 103 of the first embodiment, and a detailed description thereof will be omitted.

The driving controlling means 8 checks in step 205 whether the current cycle represnts the initial state (i=1). If YES in step 205, the flow advances to step 206. Otherwise, the flow advances to step 208.

In step 206, the all load torque data Q is calculated on the basis of the load torque data B and R, and the body driving coefficient data C.

In step 207, the overshooting amount of the driving means at the all load torque data Q upon braking at the full speed is retrieved from the table, and the retrieved data serves as the previous overshooting amount data V(0). The data V(0) is stored in the internal memory in the driving controlling means 8, and the flow advances to step 208.

The driving controlling means 8 determines in step 208 whether the current expected driving amount data M(i) is larger than the focus zone driving amount data N100. If YES in step 208, the flow advances to step 209. Otherwise, the flow advances to step 213.

In step 209, the driving means is driven at the full speed on the basis of the driving direction data D(i).

The driving controlling means 8 checks in step 210 whether the driven amount data N(i) reaches $M(i)-V(i-1)$. If NO in step 210, this step is repeated. However, if YES in this step, the flow advances to step 211.

In step 211, the driving means is braked. In step 212, the pulses of the monitor signal from the monitoring means 11 are counted in the same manner as in step 120 of FIG. 5B to obtain overshooting data V(i). The data V(i) is stored in the internal memory in the driving controlling means 8. The flow then returns to step 201.

In step 213, the current overshooting data V(i) is updated to the previous overshooting data $V(i-1)$, and the updated data is stored in the internal memory in the driving controlling means 8 in step 214. The flow returns to step 101. Every time the looped operations are completed, value "i" is incremented by one.

Unlike in this embodiment, in an apparatus wherein the motor is driven for moving the focusing lens to the just-in-focus position on the basis of data representing a deviation of an image from the focal plane and wherein the motor is stopped in response to the just-in-focus signal, the focus range may be adjusted on the basis of the overshooting amount, thereby performing proper lens driving.

In the first embodiment described above, speed control of the driving means has been described such that the speed can be stepwisely controlled by changing the duty of the driving pulses. However, the duty of the driving pulses may be continuously changed to smoothly change the speed. A method of changing the speed may be achieved by direct control of a voltage or current of a driving source.

In the flow charts of the first embodiment of FIGS. 5A and 5B and the second embodiment of FIG. 7, the focus detection step and driving control step are continuously performed by a single sequence. However, for example, the driving control step may be performed by interrupt processing. In this case, the focus detection step and the driving control step are performed according to a parallel processing scheme.

If the driving characteristics vary according to the driving direction caused by the arrangement of the driving means and the position of the apparatus, the overshooting data V(i) may be classified into VR(i) and VL(i) according to the driving directions. In the first and second embodiments, the driven amount of the driving means is measured by counting the pulses of the signal generated by the monitoring means. However, the monitoring means may generate a signal representing the absolute position of the driving means, and the driven amount may be calculated by the difference between two absolute positions.

In each embodiment of the present invention, the lens is driven on the basis of the previous overshooting amount $V(i-1)$. However, the overshooting amounts of a predetermined plurality of cycles may be stored, and an average value or a weighted average value may be used to obtain an overshooting amount for controlling the drive of the lens.

According to the present invention, the overshooting amount upon braking of the driving means is always monitored, and the current data is fed back to the next driving control cycle. Therefore, the focusing lens in the photographing optical system can be stably stopped near the just-in-focus position regardless of the characteristic inherent to the apparatus.

What I claimed is:

1. An apparatus for controlling a position of an image of an object to be photographed through a photographing optical system of a camera, including:
    (a) focus detecting means for repeatedly generating defocus signals each of which conforms to a positional relationship between a predetermined plane and the position of the image;
    (b) driving means for driving at least part of said photographing optical system;
    (c) driving control means for generating a stop signal on the basis of said defocus signals, said stop signal causing said driving means to stop said at least part of said photographing optical sytem;
    (d) memory means; and
    (e) driven amount detecting means responsive to said stop signal for detecting an amount conforming to a driven amount of said at least part of said photographing optical system from a timing of generation of said stop signal, and producing data conforming to said detected amount and stored in said memory means;
    said driving control means controlling speed of the driving of said driving means on the basis of said data stored in said memory means.

2. An apparatus according to claim 1, wherein said driven amount detecting means detects the amount conforming to the driven amount of said at least part of said photographing optical system from the timing of the generation of said stop signal during a predetermined period of time which is set so that the driving of said at least part of said photographing optical system is completed during said predetermined period of time.

3. An apparatus according to claim 2, wherein said driving control means determines the speed of the driving of said driving means after the generation of said stop signal on the basis of the amount represented by said data stored in said memory means and causes said driving means to drive at said determined speed.

4. An apparatus according to claim 3, wherein said driving control means has a plurality of predetermined speeds and selects one of said plurality of predetermined speeds on the basis of the amount represented by said data stored in said memory means.

5. An apparatus according to claim 4, which further comprises means for repeatedly producing position signals each of which conforms to a position of the driving of said at least part of said photographing optical system, and wherein said driving control means causes said driving means to drive at a maximum one of said plurality of predetermined speeds until a difference between each of said defocus signals and each of said position signals becomes within a predetermined value.

6. An apparatus according to claim 5, which further comprises means for detecting that said differences becomes within said predetermined value and sequentially producing a detecting signal, and wherein said driving control means causes said driving means to drive at said selected one of said plurality of predetermined speeds in response to said detecting signal.

7. An apparatus according to claim 1, wherein said driving control means produces other data conforming to the controlled speed of the driving of said driving means to store said other data in said memory means.

8. An apparatus according to claim 7, wherein said driving control means controls the speed of the driving of said driving means on the basis of the first-mentioned data and said other data stored in said memory means.

9. An apparatus according to claim 8, wherein said driven amount detecting means updates said first-mentioned data and said other data stored in said memory means every generation of said stop signal.

10. An apparatus for controlling a position of an image of an object to be photographed through a photographing optical system of a camera, including
    (a) focus detecting means for repeatedly generating defocus signals each of which conforms to a positional relationship between a predetermined plane and the position of the image;
    (b) driving means for driving at least part of said photographing optical system;
    (c) driving control means for generating a stop signal on the basis of said defocus signals, said stop signal causing said driving means to stop said at least part of said photographing optical system;
    (d) memory means; and
    (e) driven amount detecting means responsive to said stop signal for detecting an amount conforming to a driven amount of said at least part of said photographing optical system from a timing of generation of said stop signal and producing data conforming to said detected amount and stored in said memory means;
    said driving control means adjusting timing of the generation of said stop signal on the basis of said data stored in said memory means.

11. An apparatus according to claim 10, wherein said driven amount detecting means detects the amount conforming to the driven amount of said at least part of said photographing optical system from the timing of the generation of said stop signal during a predetermined period of time which is set so that the driving of said at least part of said photographing optical system is completed during said predetermined period of time.

12. An apparatus according to claim 11, which further comprises means for repeatedly producing position signals each of which conforms to a position of the driving of said at least part of said photographing optical system, and means for detecting that a difference between each of said defocus signals and each of said position signals becomes substantially equal to an amount conforming to said data stored in said memory means and generating a detecting signal, and wherein said driving control means generates said stop signal in response to said detecting signal.

13. An apparatus for controlling a position of an image of an object to be photographed through a photographing optical system of a camera, including:
    (a) focus detecting means for generating a defocus signal conforming to a positional relationship between a predetermined plane and the position of the image;
    (b) driving means for driving at least part of said photographing optical system;
    (c) driving control means responsive to said defocus signal for controlling said driving means and generating a stop signal which causes said driving means to stop said at least part of said photographing optical system; and (d) overshooting driven amount determining means for determining, prior to the driving of said driving means, an overshooting amount by which said at least part of said photographing optical system overshoots from a timing of generation of said stop signal and producing data conforming to the determined overshooting amount;

said driving control means controlling a speed of the driving of said driving means on the basis of said data.

14. An apparatus according to claim 13, wherein said driving control means has a plurality of speeds which are different from each other, selects one of said plurality of speeds on the basis of said data and causes said driving means to drive at said selected speed.

15. An apparatus for controlling a position of an image of an object to be photographed through a photographing optical system of a camera, including:
(a) focus detecting means for generating a defocus signal conforming to a positional relationship between a predetermined plane and the position of the image;
(b) driving means for driving at least part of said photographing optical system;
(c) driving control means for generating a stop signal on the basis of said defocus signal, said stop signal causing said driving means to stop said at least part of said photographing optical system; and
(d) overshooting driven amount determining means for determining, prior to the driving of said driving means, an overshooting amount by which said at least part of said photographing optical system overshoots from a timing of a generation of said stop signal and producing data conforming to the determined overshooting amount;

said driving control means generating said stop signal on the basis of said data.

* * * * *